United States Patent [19]

Koch

[11] 4,416,483
[45] Nov. 22, 1983

[54] ARRANGEMENT FOR STORING TOOLS AND INSTRUMENTS IN POWER VEHICLES

[75] Inventor: Adolf Koch, Waiblingen-Neustadt, Fed. Rep. of Germany

[73] Assignee: Autohaus Lorinser G.m.b.H., & Co., Waiblingen, Fed. Rep. of Germany

[21] Appl. No.: 283,665

[22] Filed: Jul. 15, 1981

[30] Foreign Application Priority Data

Jan. 16, 1981 [DE] Fed. Rep. of Germany ....... 3101161

[51] Int. Cl.³ .............................................. B60R 11/06
[52] U.S. Cl. .................................... 296/37.1; 224/309; 224/311
[58] Field of Search ................. 224/42.03 R, 42.03 A, 224/42.42 R, 42.43, 29 R, 309, 311; 296/1 C, 196, 37.8, 37.1, 51.7, 36, 24 R; 280/769; 40/591

[56] References Cited

U.S. PATENT DOCUMENTS

| 2,901,285 | 8/1959 | Walker | 296/37.1 |
| 3,231,292 | 1/1966 | Lorenz | 296/37.1 |
| 3,473,680 | 10/1969 | Downer | 224/311 |
| 3,999,693 | 12/1976 | Cooper | 296/37.1 |
| 4,065,170 | 12/1977 | Fabian | 296/37.1 |

FOREIGN PATENT DOCUMENTS

| 1991369 | 5/1968 | Fed. Rep. of Germany | 296/37.1 |
| 6943268 | 11/1969 | Fed. Rep. of Germany | 296/37.1 |
| 7306316 | 2/1973 | Fed. Rep. of Germany | 296/37.1 |
| 694544 | 12/1930 | France | 296/37.1 |

Primary Examiner—Richard A. Bertsch
Attorney, Agent, or Firm—Michael J. Striker

[57] ABSTRACT

An arrangement for storing objects in a trunk of a power vehicle has a wall element arranged at an inner surface of a trunk cover and movable relative to the latter between a closed position in which it forms a closed compartment and an open position in which the compartment is opened, and mounting elements for movably mounting the wall element at one side of the inner surface of the trunk cover so that the wall element pivots between the closed and open positions. The arrangement may have a cover for the compartment formed by the trunk cover or a separate element mounted thereon.

27 Claims, 4 Drawing Figures

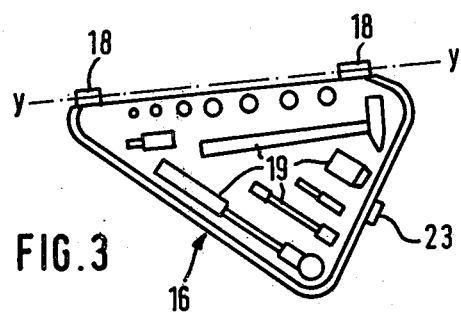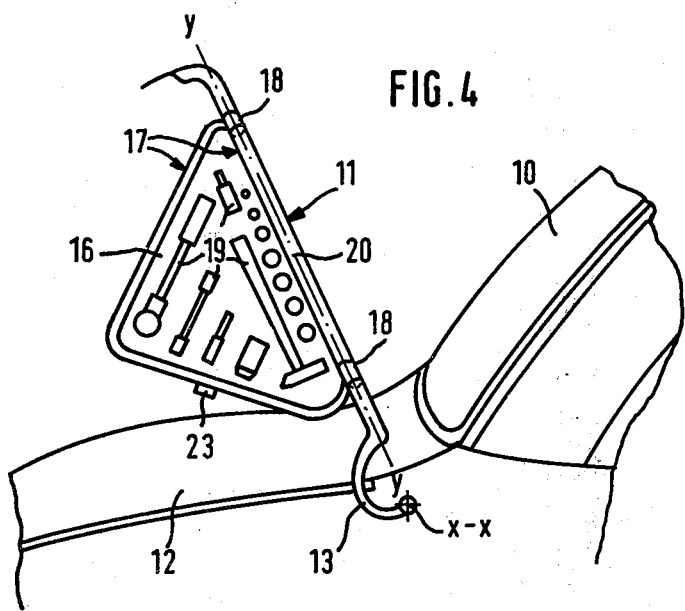

ns in power vehicles

BACKGROUND OF THE INVENTION

The present invention relates to an arrangement for storing objects, such as tools and instruments, in power vehicles. More particularly, it relates to an arrangement for storing objects on a cover of a trunk of a power vehicle. The arrangement is not limited to the storing of only tools and instruments, but also can be utilized for storing other required objects. Such a storing provides for reliable and constant readiness of the tools and instruments and occupies only a small place.

SUMMARY OF THE INVENTION

It is an object of the present invention to provide an arrangement for storing tools and instruments which is favorable and convenient and also readily accessible at the vehicle's side.

It is also an object of the present invention to provide such an arrangement for storing tools and instruments which does not occupy a central space of the trunk cover to be used for other objects, such as for the warning triangle.

In keeping with these objects, and with others which will become apparent hereinafter, one feature of the present invention resides, briefly stated, in an arrangement for storing objects, such as tools and instruments, in a trunk of a power vehicle, wherein a wall element movable between open and closed positions is provided, and mounting means mount the wall element on the inner surface of the trunk cover at one side thereof.

In accordance with another feature of the present invention, two such wall elements are provided mounted at opposite sides on the inner surface of the trunk cover. More particularly, the wall elements are provided at both sides of a vertical longitudinal plane of the power vehicle so as to form two compartments at these sides. The arrangement designed in accordance with the present invention has the advantage in the fact that the central part of the inner surface of the trunk cover is free for other objects, such as for example for a known warning triangle.

A cover for the thus formed storing compartment may be formed in the closed position by a trunk cover.

In accordance with still another feature of the present invention, the cover for the compartment may be formed as an additional number which is releasably connected with the trunk cover, so that the wall element together with the thus-formed cover is a separate enclosed unit which can be mounted on the trunk cover and dismounted from the latter.

In accordance with a further feature which provides for favorable space and location as well as stability, particularly with respect to the warning triangle mounted on the trunk cover, the pivot axis of the pivotable wall element is inclined to the turning axis of the trunk cover. Advantageously, in condition of the vertically open trunk cover, the pivot axis of the wall element ascends toward the vertical longitudinal plane of the vehicle or is inclined to the tip of the warning triangle. It is especially advantageous when the wall element has a triangular shape.

Still a further feature of the present invention resides in the fact that the wall element is formed as a flat member which in the closed position only insignificantly protrudes above the inner surface of the trunk cover. The wall element may be formed as a molded member of metal or synthetic plastic material. Such a wall element is especially advantageous with respect to the space economy in the trunk chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a plan view of the opened storing arrangement in accordance with the present invention; and FIG. 4 is a lateral view of the power vehicle with the trunk cover and the inventive storing arrangement.

DESCRIPTION OF THE PREFERRED EMBODIMENT

Figure 1:
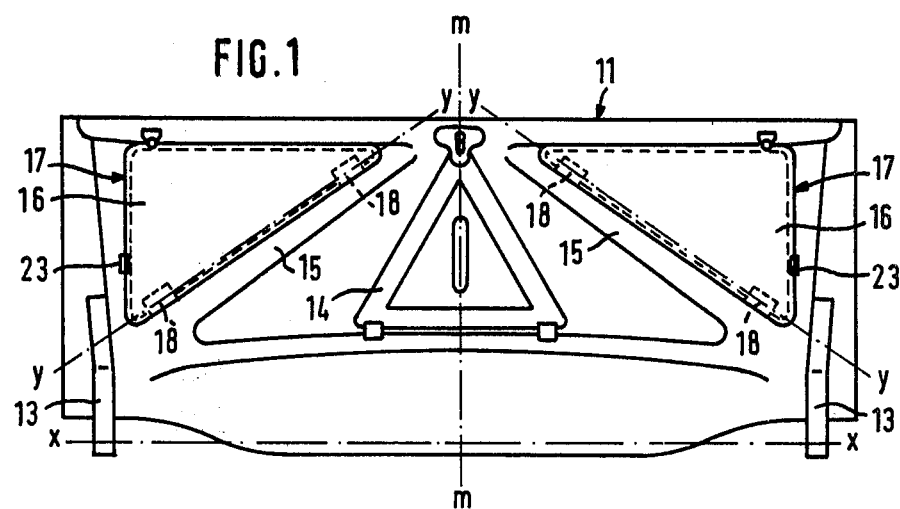
FIG. 1 is a rear view at a rear part of a passenger power vehicle with an open trunk cover and an inventive storing arrangement in its closed position.

An arrangement for storing objects, such as tools and instruments, in a power vehicle is mounted on a cover 11 of a trunk 12 behind a rear window of a passenger power vehicle. The trunk cover 11 moves between its open and closed position by turning about a horizontal axis X—X relative to the power vehicle body with the aid of lateral pivot arms 13. The trunk cover 11 moves to its open position upwardly so that it assumes a position shown in the drawings.

A warning triangle 14 is detachably mounted on the inner surface of the trunk cover 11 in its central part in a known manner, for example, symmetrically relative to the vertical longitudinal plane M—M of the power vehicle. The trunk cover 11 is provided with diagonally extending reinforcing strips 15 at each side of the longitudinal central plane which are inclined and extend upwardly toward the longitudinal central plane and thereby toward the upper tip of the warning triangle 14. A main element 16 of a storing arrangement 17 is arranged at each side of the longitudinal central axis of the vehicle. More particularly, the main element 16 is pivotally mounted on the inner surface of the trunk cover 11 with the aid of a bearing 18 arranged on the diagonal strip 15. The bearing 18 forms an inclined pivot axis Y—Y about which the main element 16 pivots between open and closed positions of the storing arrangement 17.

Figure 2:
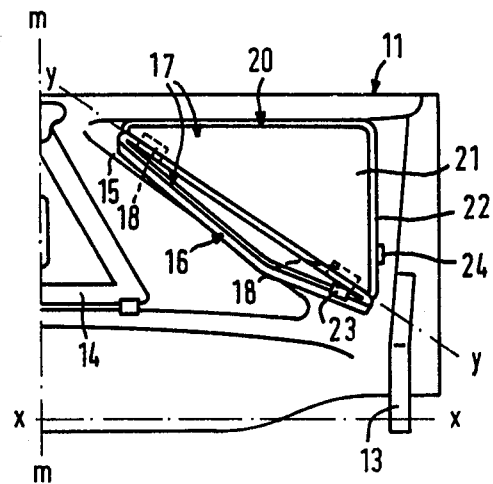
FIG. 2 is a partial view substantially corresponding to the view of FIG. 1 and showing the inventive storing arrangement in an open position.

As can be seen from FIG. 2, the wall element 16 is mainly inclined along the pivot axes Y—Y, but is also inclined toward the tail section (not shown) of the power vehicle.

The main element 16 has a triangular shape. More particularly, it is formed as a right triangle with a hypotenuse extending along the respective reinforcing strip 15 of the trunk cover 11, in other words, the hypotenuse of the right triangle which forms the main element 16 is formed by the pivot axis Y—Y of the main element. The main element 16 of the storing arrangement 17 serves for receiving a plurality of individual tools or instruments 19 and is provided for this purpose with a plurality of receiving formations, for example, recess or projections, as shown in FIGS. 3 and 4.

The storing arrangement 17 is provided with a cover which may be formed by the trunk cover 11. The cover of the storing arrangement 17 may also be formed by a part 20 of the trunk cover 11, the part being limited by a formation provided in the trunk cover 11. This formation may be formed as a surrounding rib 22 which limits a flat depression in the trunk cover 11. On the other other hand, this formation may also be formed as a groove-shaped edge limiting the part of the trunk cover 11. In the closed position of the storing arrangement 17, the main element 16 abuts the above-mentioned formation.

The main element 16 of the storing arrangement 16 is formed as a flat member which in the closed position only insignificantly protrudes above the inner surface of the trunk cover 11. Thereby, the interior of the trunk space is actually not affected by the storing arrangement 17. The main element 16 may be formed as a molded member composed of metal or synthetic plastic material, in dependence upon the requirements made to the tools and other objects to be received in the storing arrangement 17.

The storing arrangement 17 may be provided with a cover which is separate from the trunk cover 11 and cooperates with the main element 16. The thus formed cover of the arrangement may be releasably connected with the trunk cover 11 and formed together with the main element 16, a separate unit detachable from the trunk cover. In insert, for example of felt can be arranged on the trunk cover 11, and the main element 16 in the closed position of the arrangement 17 sealingly abuts against the felt insert which is identified by reference numeral 21. In the open position of the arrangement 17, the displacement of the main element 16 may be limited by an abutment provided on the trunk cover 11 so that the main element 16 in the open position is inclined as shown in the drawing.

Locking elements are further provided for holding the main element 16 in the closed position of the arrangement 17. The locking elements may be formed as arresting elements identified by reference numeral 33 which engage in the closed position into corresponding counter elements 24 of the trunk cover 11. Thereby, the main element 16 and the storing arrangement 17 is held in the closed position.

It will be understood that each of the elements described above, or two or more together, may also find a useful application in other types of constructions differing from the types described above.

While the invention has been illustrated and described as embodied in an arrangement for storing tools and instruments in a trunk of a power vehicle it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for storing objects, particularly tools and instruments, in a trunk of a power vehicle, the trunk having a trunk cover turnable about a turning axis for opening and closing thereof, said arrangement comprising a wall element arranged at an inner surface of the trunk cover and pivotable about a pivot axis relative to the trunk cover between a closed position in which it forms a closed compartment and an open position in which the compartment is opened, wherein the pivot axis is inclined relative to the turning axis of said trunk cover so that in the open position said wall element is inclined toward a side of the vehicle and thereby facilitates access to the tools and instruments; and means for pivotally mounting said wall element at one side of said inner surface of said trunk cover.

2. An arrangement as defined in claim 1, wherein the trunk cover is arranged to be alternately in closed and open condition, said wall element in the open condition of the trunk cover being movable toward said open position by pivoting in a downward direction.

3. An arrangement as defined in claim 1, wherein the power vehicle has a vertical longitudinal plane, said wall element being located at one side of the vertical longitudinal plane; and further comprising a second such wall element and second such means for movably mounting said second wall element at said inner surface of the trunk cover, said second wall element being located at the other side of the vertical longitudinal plane of the power vehicle.

4. An arrangement as defined in claim 3, wherein said mounting means for mounting said wall element is arranged so that said pivot axis of said wall element ascends toward the vertically extending longitudinal plane.

5. An arrangement as defined in claim 1, wherein said mounting means for pivotally mounting said wall element at said inner surface of the trunk cover is arranged to mount said wall element releasably from the trunk cover.

6. An arrangement as defined in claim 1, wherein said wall element has a plurality of receiving formations for receiving the tools and instruments.

7. An arrangement as defined in claim 1, wherein the trunk cover has a warning triangular piece at its inner surface, said wall element being arranged at one side of the warning triangular piece.

8. An arrangement as defined in claim 7, wherein the warning triangular piece has a tip, said mounting means for mounting said wall element being arranged so that said pivot axis of said wall element is inclined toward the tip of the warning triangular piece.

9. An arrangement as defined in claim 7; and further comprising a second such wall element, and second such mounting means for movably mounting said second wall element at the inner surface of the trunk cover, said second wall element being located at the other side of the warning triangular piece.

10. An arrangement as defined in claim 1, wherein said wall element has a triangular shape.

11. An arrangement as defined in claim 10, wherein said wall element has a shape of a triangle with a hypotenuse substantially forming said pivot axis.

12. An arrangement as defined in claim 1, wherein said mounting means includes a bearing which defines said pivot axis and pivotally mounts said wall element to the trunk cover.

13. An arrangement as defined in claim 12, wherein the trunk cover has a reinforcing rib at its inner surface, said bearing defining said pivot axis being arranged on the reinforcing rib of the trunk cover.

14. An arrangement as defined in claim 1; and further comprising means for easily releasably locking said wall element with the trunk cover in said closed position.

15. An arrangement as defined in claim 14, wherein said locking means for locking said wall element includes a fastening element.

16. An arrangement as defined in claim 14, wherein said locking means for locking said wall element includes an arresting element.

17. An arrangement as defined in claim 1, wherein said wall element is arranged so that in said closed position the trunk cover forms a cover of said compartment.

18. An arrangement as defined in claim 1, wherein the trunk cover has a part provided with a limiting formation, said wall element being arranged so that in said closed position the part forms a cover of said compartment and said wall element abuts against the limiting formation.

19. An arrangement as defined in claim 18, wherein the formation of the part of the trunk cover is a ring-shaped circumferential rib, said wall element abutting in said closed position against the rib.

20. An arrangement as defined in claim 18, wherein the formation of the part of the trunk cover is a groove-shaped edge, said wall element abutting in said closed position against the edge.

21. An arrangement as defined in claim 1; and further comprising an insert which forms a cover for said compartment.

22. An arrangement as defined in claim 21, wherein said insert forming a cover for said compartment is composed of felt.

23. An arrangement as defined in claim 1, wherein said wall element is formed as a flat member which in said closed position only insignificantly protrudes above the inner surface of the trunk cover.

24. An arrangement as defined in claim 23, wherein said wall element is a molded member.

25. An arrangement as defined in claim 24, wherein said molded member which forms said wall element is composed of metal.

26. An arrangement as defined in claim 24, wherein said molded member which forms said wall element is composed of a synthetic plastic material.

27. The arrangement as defined in claim 1, wherein said wall element is inclined towards a tail section of the power vehicle.

* * * * *